Figure 3:
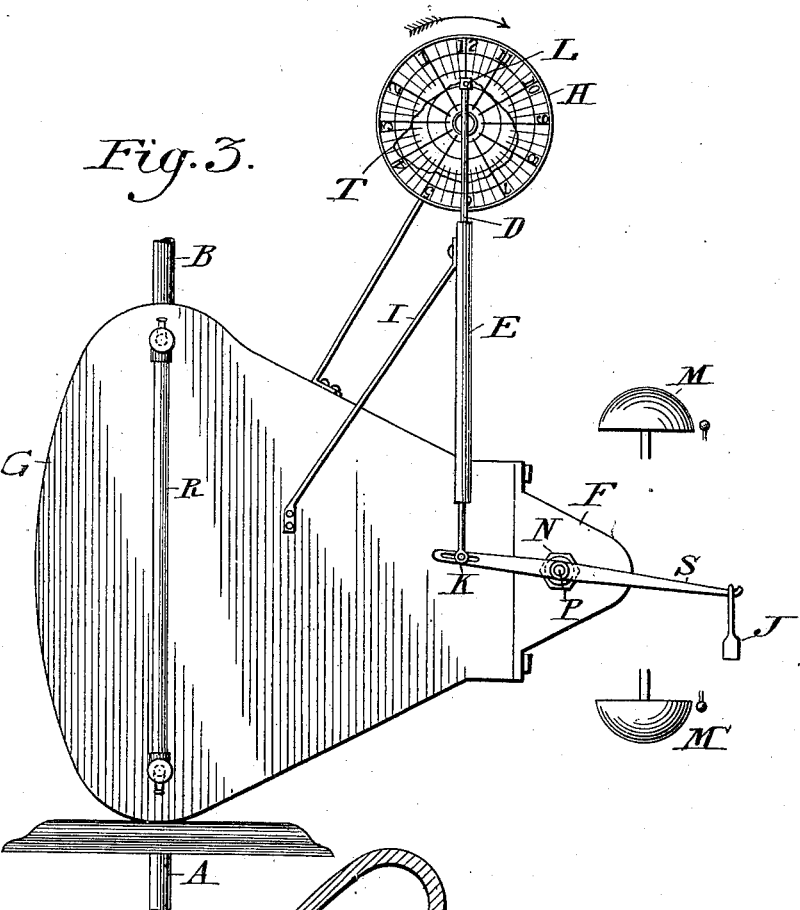

No. 686,861. Patented Nov. 19, 1901.
D. MOORE.
STEAM BOILER WATER INDICATOR AND RECORDER.
(Application filed Apr. 6, 1901.)
(No Model.) 3 Sheets—Sheet 1.
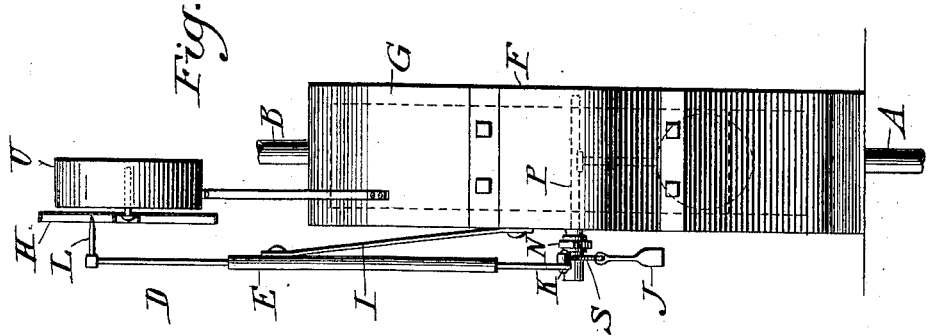
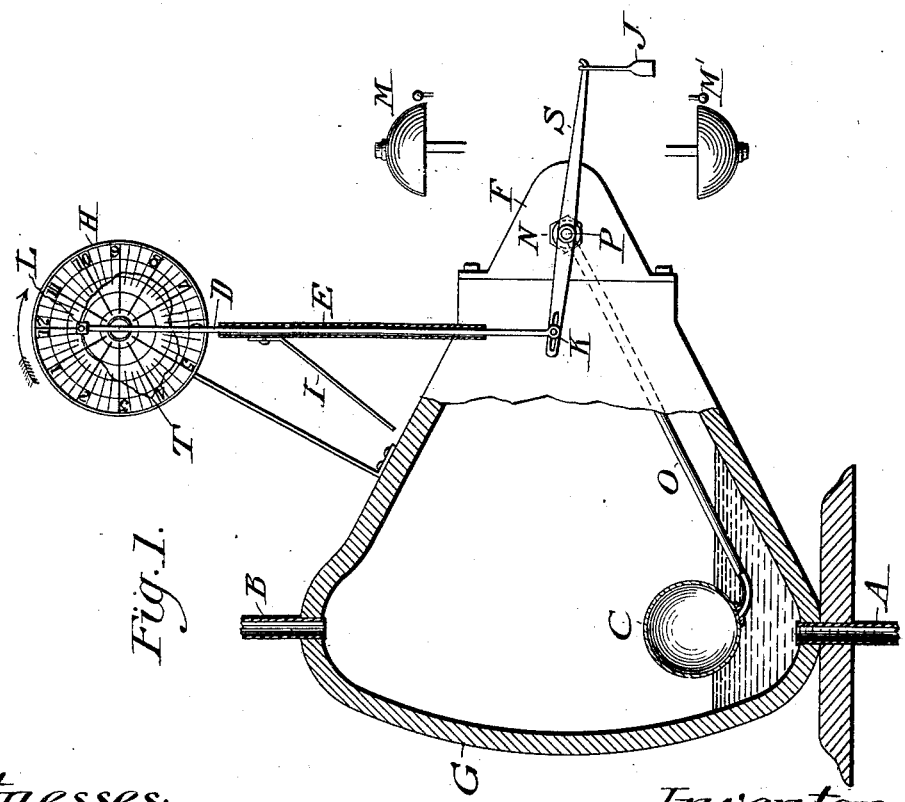
Witnesses:
Stella A. Hughes.
Louis A. Piaget
Inventor:
David Moore
By John F. Kerr
Attorney No. 686,861. Patented Nov. 19, 1901.
D. MOORE.
STEAM BOILER WATER INDICATOR AND RECORDER.
(Application filed Apr. 6, 1901.)
(No Model.) 3 Sheets—Sheet 2.

Witnesses:
Stella A. Hughes
Louis A. Pinget

Inventor:
David Moore
By John F. Kerr
Atty

No. 686,861. Patented Nov. 19, 1901.
D. MOORE.
STEAM BOILER WATER INDICATOR AND RECORDER.
(Application filed Apr. 6, 1901.)
(No Model.) 3 Sheets—Sheet 3.
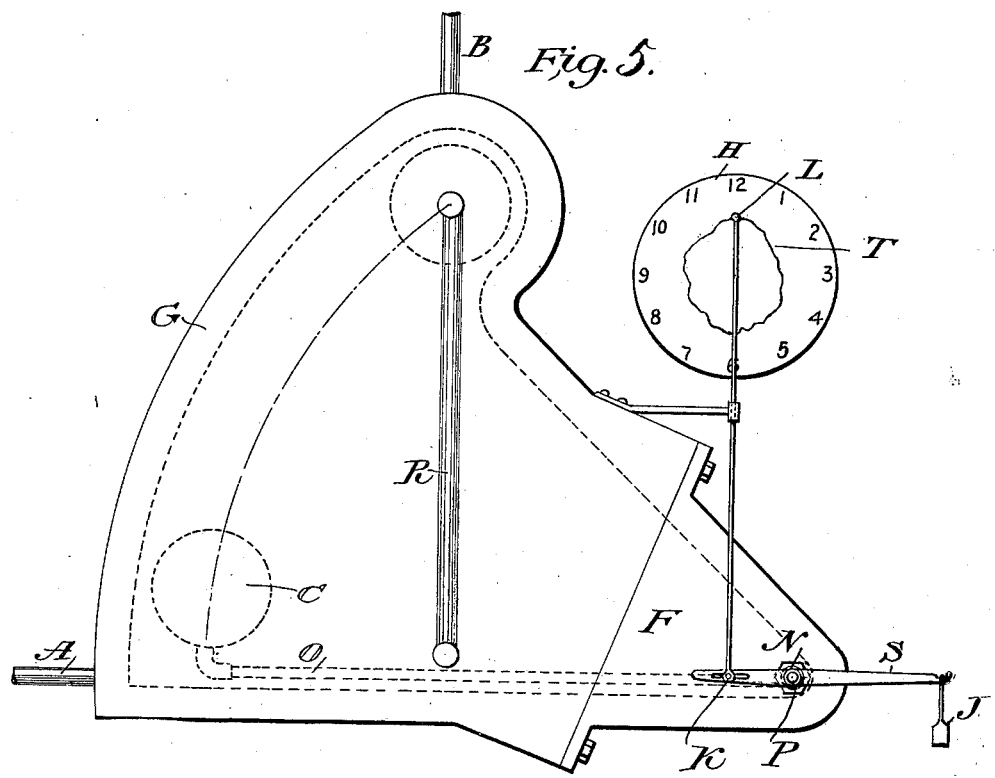

UNITED STATES PATENT OFFICE.

DAVID MOORE, OF PATERSON, NEW JERSEY.

STEAM-BOILER WATER INDICATOR AND RECORDER.

SPECIFICATION forming part of Letters Patent No. 686,861, dated November 19, 1901.

Application filed April 6, 1901. Serial No. 54,767. (No model.)

*To all whom it may concern:*

Be it known that I, DAVID MOORE, a citizen of the United States, residing at 148 Barclay street, city of Paterson, in the county of Passaic and State of New Jersey, have invented certain new and useful Improvements in Steam-Boiler Water Indicators and Recorders, of which the following is a specification, reference being had therein to the accompanying drawings.

There are many devices for indicating the height of water in steam-boilers and for sounding an alarm when either high or low water mark is reached; but the object of my invention is not only to accomplish the above-mentioned results, but to provide a recording device that may be located not on the boiler, but in a private office or other place fifty or one hundred feet away from said boiler, a device not for the use of the fireman or engineer, but for the use of the employer or superintendent that he may be able to tell at what height the water was in the boiler at any given time by referring to the recording-dial. For the guidance and inspection of the fireman or other person in charge of the boiler the usual gages or indicators may be attached to the boiler.

My recorder in case of accident would be reliable proof as to the fact that there was or was not sufficient water in the boiler, and being at a great distance away from the boiler there would be some probability of its escaping destruction, which would be the fate of a device attached or secured to a boiler, as the indicators in use all seem to be connected.

My invention consists in a float-chamber of novel and peculiar shape and construction, preferably cast in two pieces, to facilitate the insertion or removal therefrom of a float connected with a rocking shaft located in the narrow end thereof, the rocking of which shaft lowers or elevates a pencil as the water rises or falls in said float-chamber; a rotating dial and a holder therefor adapted to rotate in the same direction as the hands of a clock, the hours on said dial being indicated just the reverse of the manner in which they are indicated upon the dial of a clock; a clock or other mechanism adapted to rotate said dial, and means for holding said dial in frictional contact with a pencil or marker; means for guiding said pencil and limiting it to a vertical movement, said rotating dial being divided on both faces thereof into divisions and subdivisions by circles and radially-extending lines adapted to represent various divisions of time—such as minutes, hours, days, or weeks—and also to represent by figures or otherwise the height of the water at all times;
means to counterbalance the marking device and float and a glass water-gage secured to said float-chamber, and means for automatically giving an alarm when either high or low water mark is reached, the whole device to be located at a considerable distance, say fifty feet or one hundred feet from the boiler, in any private room or office where desired for the purpose of detecting any neglect or inattention on the part of the engineer and for the purpose of keeping a record of the elevation or fall of the water.

Figure 4:
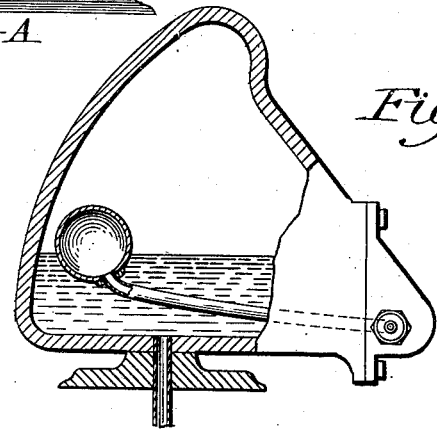

Figure 1 is a front elevation, partly in section, portions being omitted, illustrating my float-chamber, pencil-operating device, and clockwork or other mechanism for operating my rotating dial for recording the elevation or fall of the water in a steam-boiler. Fig. 2 is a side elevation of the same looking toward the narrow end of the float-chamber, and Fig. 3 is a front view of the float-chamber provided with a water-gage and alarm-bells and showing a vertical guide and support for said guide to limit the action of the pencil-holder to a vertical movement upon the rise and fall of the float in the float-chamber. Fig. 4 is another view of my invention, showing the hollow curved stem extending downwardly from the float to the rock-shaft; and Fig. 5 on page 3 of the drawings is another view of the same.

No boiler is shown in the drawings, it not being deemed necessary for the purpose of this application. The float-chamber and recorder connected therewith are intended to be set up in a private office or apartment at a suitable distance from the boiler-room, as it is not meant to be a guide for the use of the engineer, but is meant for the employer's use as a monitor to report the attention or inattention of the engineer, night-watchman, or other person in charge of the boiler.

In the drawings, G represents the float-chamber, C the float, and O an arm or spindle connecting the float with the rocking shaft P. The rocking shaft P is mounted in the walls of the narrow end of the float-chamber, one end of the shaft extending outside of the float-chamber, a water-tight joint being made by means of a suitable stuffing-box N. The float-chamber consists of two parts, the small narrow end being detachable with facility from the other portion of the float-chamber. The two parts have a ground joint and are secured together by suitable bolts. On the end of the shaft P which projects outside of the float-chamber is secured a lever S, on one end of which is suspended a counterbalance-weight and to the other end of which is pivotally secured at K a pencil-support D, which is directed in and limited to a vertical movement because of its passage through a vertical guide E, which is secured by supports I, attached to the outer portion of the float-chamber. In the upper end of the pencil-support a pencil or other recording material L is suitably connected.

Mounted on or near the float-chamber on any suitable support is a clock U or other suitable device for holding a double-faced rotating dial H and causing the same to rotate in the same direction as the hands of a clock. Both sides of my rotating dial H are divided by concentric circles and radially-extending lines into divisions which may mean various periods of time. On the dial shown in Fig. 1 the dial is divided like the dial of a clock into twelve main divisions, each division representing one hour. Each division of one hour is subdivided into four divisions, each subdivision representing a quarter of an hour. As I cause my dial to be rotated in the same direction as the hands of a clock, the hours are numbered on the dial in a reverse manner. The dial traveling in the direction indicated by the arrow it will take it one hour to travel from the position in which it is shown in Fig. 1, where the pencil indicates it to be twelve o'clock, until the radial line (indicated by 1) arrives at the point of the pencil, and so on through all the following hours. Behind the removable dial is a plate which keeps the dial in contact with the end of the pencil during the revolution of the dial. The pencil while in contact therewith traces on the dial, which tracing T is shown in Fig. 1. Said tracing represents the continuous record for twelve hours (as said dial is shown divided) of the varying elevation and fall of the water in the boiler. As the water in the boiler rises, the water in the float-chamber will also rise, causing the float to be elevated, thereby turning the rock-shaft P, operating the lever S, and forcing the pencil-support D upward in the vertical guide E, or the reverse if the water in the boiler should fall, so that my rotary dial travels in the same direction as the hands of a clock, and my tracer or pencil is limited to a vertical movement, making an automatic recording device. The height of the water may be told by figures arranged on the radial lines, the various heights being indicated by concentric circles crossing said radial lines. Said heights may agree with the heights indicated by the water in the water-gage R, which is also secured to the outside of the float-chamber G. The twelve-hours' record having been made, as shown on the dial in Fig. 1, the dial may be removed and reversed and used until twelve hours' record is made on the other side, when said dial may be thrown away or filed on a peg for future reference.

My float-chamber is made in a form closely resembling the shape of a harp. From below a water-pipe enters the float-chamber and from above a steam-pipe. From these pipes are run lines of pipes for a distance of from fifty to one hundred feet to the boiler for the purpose of connecting the float-chamber with the steam-boiler. As the rising and falling of the float causes the lever S to rock, the lever S at either end may be made to come in contact with electrically-connected plates to cause a bell to sound an alarm at any high and low water mark desired.

It is obvious that instead of having my water-recording pencil above the center of the dial, I might have its field of operation between the center and the lower edge of the dial and utilize the space between the center and the upper edge of the dial for the operations of a pencil similarly located and operated by the pinion or spindle of a steam-gage and having a similar vertical movement, but adapted to record the variations of pressure indicated by the steam-gage, in which case pencils or markers of different colors may be employed.

Owing to the simplicity of the construction of the float-chamber it may be taken apart with facility for the purpose of removing the float or for any other reason.

I propose to have a portion of my rocking shaft P tubular and have the tubular end projecting through the stuffing-box N and to connect the ball-float and the rocking shaft by means of a tubular stem O for the purpose of permitting any water which might accumulate in the float by reason of the internal sweating of the ball to pass away by gravity through the tubular end of the rocking shaft, and the harp-shaped float-chamber is to be so erected or located that when there is any water at all in the float-chamber the float will be on a higher plane than that of the rocking shaft, so that it would be impossible for any water to remain in the float, as it would pass down by gravity through the inclined tubular stem O to the rocking shaft, through which it would empty in any suitable manner.

With this description of my invention, what I claim is—

1. In a steam-boiler water-recorder, the combination of a clock-movement, a two-faced reversible and removable recording-dial secured to the hour-spindle thereof, and adapted to be rotated thereby, with a pencil-support limited to a vertical movement, a pencil or marker secured to said support, a vertical guide for said pencil-support, a float-chamber, a rocking shaft partly tubular and journaled in the narrow portion of said float-chamber, a float connected with said rocking shaft, a stuffing-box on said float-chamber through which one end of said rocking shaft passes, a lever secured to the projecting end of said rocking shaft, said pencil-support pivotally connected with one end of said lever, and a counterbalance-weight secured to the other end of said lever, substantially as set forth.

2. In a steam-boiler water-recorder, a float-chamber substantially harp-shaped in form, consisting of two parts, F and G having a ground joint, and secured together by suitable bolts, in combination with a rocking shaft partly tubular and journaled in the part F, a stuffing-box on said part F, the tubular end of said rocking shaft passing through said stuffing-box, a hollow ball-float, and a tubular stem curved downwardly from the float to, and connecting said float with, the tubular portion of the rocking shaft, to drain by gravity, through the tubular stem and rocking shaft, any water resultant from the internal sweating of the ball, substantially as set forth.

In testimony whereof I affix my signature in presence of two witnesses.

DAVID MOORE.

Witnesses:
  STELLA A. HUGHES,
  JOHN F. KERR.